(12) United States Patent
Goldwater

(10) Patent No.: US 9,174,691 B2
(45) Date of Patent: Nov. 3, 2015

(54) UNIVERSAL MOUNT BATTERY HOLDER FOR BICYCLES

(76) Inventor: Dan Goldwater, Amherst, MA (US)

( * ) Notice: Subject to any disclaimer, the term of this patent is extended or adjusted under 35 U.S.C. 154(b) by 1076 days.

(21) Appl. No.: 13/218,730

(22) Filed: Aug. 26, 2011

(65) Prior Publication Data

US 2013/0020786 A1    Jan. 24, 2013

Related U.S. Application Data

(63) Continuation-in-part of application No. 13/187,588, filed on Jul. 21, 2011, now Pat. No. 8,789,988.

(51) Int. Cl.
| | |
|---|---|
| B62J 11/00 | (2006.01) |
| B62J 6/00 | (2006.01) |
| B62J 6/20 | (2006.01) |
| B62M 6/90 | (2010.01) |

(52) U.S. Cl.
CPC ... B62J 11/00 (2013.01); B62J 6/20 (2013.01); B62K 2208/00 (2013.01); B62M 6/90 (2013.01); Y10S 224/902 (2013.01)

(58) Field of Classification Search
CPC ............. B62J 11/00; B62J 6/20; B62M 6/90; Y10S 224/902
USPC ......... 224/422, 425, 441, 445, 448, 450, 902; 362/473
See application file for complete search history.

(56) References Cited

U.S. PATENT DOCUMENTS

| | | | |
|---|---|---|---|
| 559,801 A | 5/1896 | Hoffman | |
| 626,627 A | 6/1899 | Middlekauff | |
| 653,243 A | 7/1900 | Hussey | |
| 1,439,430 A | 12/1922 | Lyhne | |
| 2,299,762 A | 10/1942 | McDermott | |
| 2,728,824 A | 12/1955 | Whildin | |
| 2,811,633 A | 10/1957 | Bjork | |
| 3,878,387 A * | 4/1975 | Kovacic | 362/473 |
| 4,077,485 A * | 3/1978 | Bonora et al. | 180/68.5 |
| 4,135,229 A | 1/1979 | Modurkay | |
| 4,225,848 A * | 9/1980 | Roberts | 340/432 |
| 4,339,060 A | 7/1982 | Braida, Jr. | |
| 4,597,031 A | 6/1986 | Tsuyama | |
| 4,618,081 A | 10/1986 | Miree | |
| 4,736,921 A | 4/1988 | Zane et al. | |
| 4,763,230 A * | 8/1988 | Cummings et al. | 362/473 |
| 4,787,014 A * | 11/1988 | Wodder et al. | 362/473 |
| 4,998,652 A | 3/1991 | Champagne | |

(Continued)

FOREIGN PATENT DOCUMENTS

GB    2294753 A  *  5/1996

*Primary Examiner* — Justin Larson
(74) *Attorney, Agent, or Firm* — Porter, Wright, Morris & Arthur, LLP

(57) ABSTRACT

An accessory for attachment to a wheeled vehicle such as a bicycle includes a body portion and a mounting portion. The mounting portion has a V-shaped groove for receiving a wide range of shapes and sizes of frame tubing, wheel hubs, and the like. The groove has first and second portions separated by a notch to engage curved tubing with at least two contacts. A pair of cable ties secures the accessory to the tubing or the hub. A plurality of interchangeable mounting portions can be provided for mounting the accessory to the bicycle in different orientations. When a light is secured to a wheel, the accessory can be a battery holder secured to the hub on an opposite side of the hub from the light to offset weight of the light. The wheel can be balanced with proper radial positioning of the light and the battery holder.

34 Claims, 15 Drawing Sheets

(56) References Cited

U.S. PATENT DOCUMENTS

| | | | | |
|---|---|---|---|---|
| 5,019,767 A * | | 5/1991 | Shirai et al. | 320/112 |
| 5,121,305 A | | 6/1992 | Deed et al. | |
| 5,181,774 A | | 1/1993 | Lane | |
| 5,217,824 A * | | 6/1993 | Womack | 429/96 |
| 5,226,341 A | | 7/1993 | Shores | 74/551.8 |
| 5,276,593 A * | | 1/1994 | Lighthill et al. | 362/473 |
| 5,330,215 A | | 7/1994 | Bishaf et al. | |
| 5,332,183 A | | 7/1994 | Kagayama | |
| 5,337,225 A | | 8/1994 | Brookman | |
| 5,355,746 A | | 10/1994 | Lin | |
| D353,986 S * | | 1/1995 | Maglica | D8/72 |
| 5,426,570 A * | | 6/1995 | Davis | 362/473 |
| 5,464,135 A * | | 11/1995 | Studdiford | 224/420 |
| 5,469,342 A * | | 11/1995 | Chien | 362/84 |
| 5,523,924 A * | | 6/1996 | Davis | 362/473 |
| 5,544,027 A | | 8/1996 | Orsano | |
| 5,559,681 A | | 9/1996 | Duarte | |
| 5,584,562 A * | | 12/1996 | Geran | 362/473 |
| 5,597,225 A | | 1/1997 | Davis | |
| 5,732,915 A * | | 3/1998 | Heard | 248/219.4 |
| 5,765,936 A * | | 6/1998 | Walton et al. | 362/473 |
| 5,794,828 A | | 8/1998 | Colan et al. | |
| 5,800,039 A * | | 9/1998 | Lee | 362/473 |
| 5,836,673 A | | 11/1998 | Lo | |
| 5,842,714 A | | 12/1998 | Spector | |
| 5,848,837 A | | 12/1998 | Gustafson | |
| 5,857,273 A | | 1/1999 | Rapisarda | |
| 5,860,728 A | | 1/1999 | Maglica | |
| 5,887,774 A * | | 3/1999 | Bethune | 224/414 |
| 5,927,845 A | | 7/1999 | Gustafson et al. | |
| 5,934,792 A | | 8/1999 | Camaroto | |
| 6,060,982 A * | | 5/2000 | Holtrop | 340/432 |
| 6,070,897 A * | | 6/2000 | Hsieh et al. | 280/291 |
| 6,095,270 A * | | 8/2000 | Ishikawa | 180/68.5 |
| 6,106,189 A * | | 8/2000 | Seale | 403/398 |
| 6,186,635 B1 * | | 2/2001 | Peterson et al. | 362/84 |
| 6,229,948 B1 | | 5/2001 | Blee et al. | |
| 6,286,982 B1 | | 9/2001 | Tashiro | |
| 6,371,637 B1 | | 4/2002 | Atchison et al. | |
| 6,382,488 B1 * | | 5/2002 | Hancock | 224/547 |
| 6,423,443 B1 * | | 7/2002 | Tsuboi et al. | 429/98 |
| 6,431,422 B1 | | 8/2002 | Moore et al. | |
| 6,446,922 B2 | | 9/2002 | Irie | |
| 6,461,017 B2 * | | 10/2002 | Selkee | 362/237 |
| 6,486,399 B1 | | 11/2002 | Armstrong et al. | |
| 6,501,245 B2 * | | 12/2002 | Okuda | 320/112 |
| 6,514,096 B1 | | 2/2003 | Liu | |
| 6,527,240 B1 * | | 3/2003 | Huang | 248/311.2 |
| 6,561,473 B1 * | | 5/2003 | Ianello | 248/219.4 |
| 6,568,838 B2 | | 5/2003 | Taylor et al. | |
| 6,572,249 B2 | | 6/2003 | Bailey | |
| 6,601,971 B1 | | 8/2003 | Ko | |
| 6,664,937 B2 | | 12/2003 | Vermette et al. | |
| 6,669,220 B2 * | | 12/2003 | Meggiolan | 280/288.4 |
| 6,673,293 B1 | | 1/2004 | Mistopoulos et al. | |
| 6,697,130 B2 | | 2/2004 | Weindorf et al. | |
| 6,779,913 B2 * | | 8/2004 | Niezrecki et al. | 362/473 |
| 6,840,655 B2 | | 1/2005 | Shen | |
| 6,846,094 B2 | | 1/2005 | Luk | |
| 6,920,806 B2 | | 7/2005 | Cutsforth | |
| 6,923,355 B2 * | | 8/2005 | Campagnolo | 224/414 |
| 7,021,792 B2 | | 4/2006 | Lin | |
| 7,034,230 B2 | | 4/2006 | Fan | |
| 7,210,818 B2 | | 5/2007 | Luk et al. | |
| 7,267,352 B2 * | | 9/2007 | Ishikawa | 280/288.4 |
| 7,488,100 B2 * | | 2/2009 | Roberts | 362/473 |
| 7,594,741 B2 * | | 9/2009 | Okajima et al. | 362/473 |
| 7,628,518 B2 * | | 12/2009 | Fujii et al. | 362/476 |
| 7,686,477 B2 | | 3/2010 | Southard et al. | |
| 7,874,533 B1 * | | 1/2011 | Gates et al. | 248/205.1 |
| 7,886,947 B2 | | 2/2011 | Campagnolo | |
| 8,083,112 B2 * | | 12/2011 | Kuo | 224/425 |
| 8,142,046 B2 * | | 3/2012 | Lin | 362/192 |
| 8,162,191 B2 * | | 4/2012 | Tetsuka et al. | 224/459 |
| 8,220,679 B2 * | | 7/2012 | Yoshida et al. | 224/425 |
| 8,220,815 B2 * | | 7/2012 | Buckenberger et al. | 280/288.4 |
| 8,387,939 B2 * | | 3/2013 | Ford | 248/473 |
| 8,413,947 B2 * | | 4/2013 | Chiang | 248/553 |
| 8,534,519 B2 * | | 9/2013 | Hancock et al. | 224/401 |
| 8,545,069 B2 * | | 10/2013 | McCaslin et al. | 362/474 |
| 8,651,212 B2 * | | 2/2014 | Vincenz | 180/205.1 |
| 8,733,989 B1 * | | 5/2014 | Lo et al. | 362/473 |
| 8,789,988 B2 * | | 7/2014 | Goldwater | 362/473 |
| 8,851,348 B2 * | | 10/2014 | Zuraski et al. | 224/425 |
| 8,881,857 B2 * | | 11/2014 | Binggeli et al. | 180/207.1 |
| 8,888,499 B2 * | | 11/2014 | Goldwater | 434/376 |
| 8,893,837 B2 * | | 11/2014 | Kwag et al. | 180/68.5 |
| 8,911,103 B2 * | | 12/2014 | Matthews et al. | 362/191 |
| 2003/0022743 A1 * | | 1/2003 | Meggiolan | 474/70 |
| 2003/0168247 A1 | | 9/2003 | Schrek et al. | |
| 2003/0214809 A1 | | 11/2003 | Wong | |
| 2004/0065707 A1 * | | 4/2004 | Haagstad | 224/519 |
| 2005/0018417 A1 | | 1/2005 | Chien | |
| 2005/0035165 A1 * | | 2/2005 | Tsai | 224/427 |
| 2006/0158890 A1 * | | 7/2006 | Freedman | 362/390 |
| 2006/0232988 A1 * | | 10/2006 | Wang et al. | 362/475 |
| 2006/0261112 A1 * | | 11/2006 | Gates et al. | 224/558 |
| 2007/0241248 A1 | | 10/2007 | Carnevali | |
| 2007/0247858 A1 * | | 10/2007 | Ford | 362/382 |
| 2007/0263385 A1 | | 11/2007 | Fan | |
| 2008/0067526 A1 | | 3/2008 | Chew | |
| 2008/0088108 A1 | | 4/2008 | Yoshida et al. | |
| 2008/0232103 A1 | | 9/2008 | Nall et al. | |
| 2009/0261134 A1 | | 10/2009 | Tetsuka et al. | |
| 2010/0182797 A1 * | | 7/2010 | Wells | 362/474 |
| 2012/0182748 A1 * | | 7/2012 | McCaslin et al. | 362/473 |
| 2012/0243245 A1 * | | 9/2012 | Smith et al. | 362/473 |
| 2013/0004818 A1 * | | 1/2013 | Honda et al. | 429/98 |
| 2013/0020786 A1 | | 1/2013 | Goldwater | 280/727 |
| 2013/0182423 A1 * | | 7/2013 | Matthews et al. | 362/191 |
| 2014/0123483 A1 * | | 5/2014 | Wilsey et al. | 29/825 |

* cited by examiner

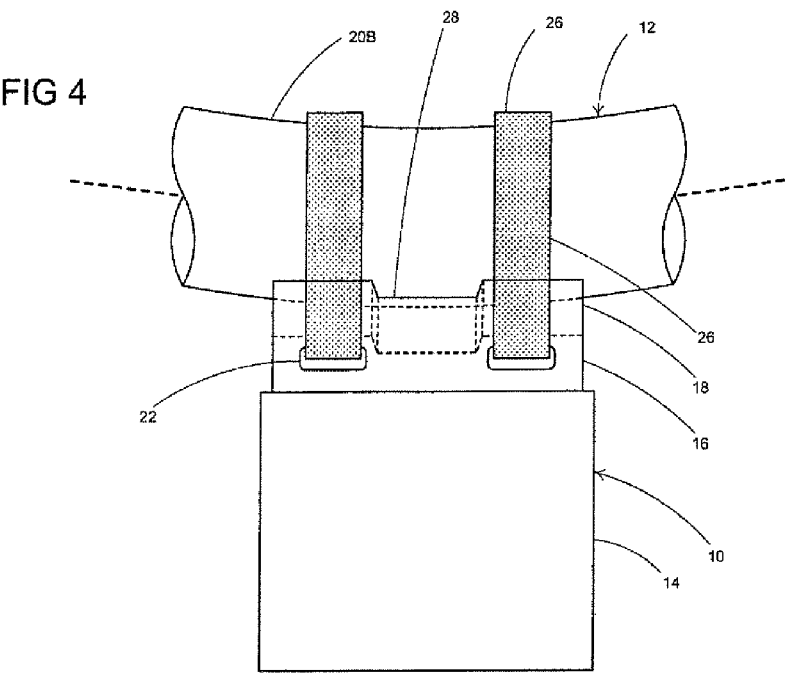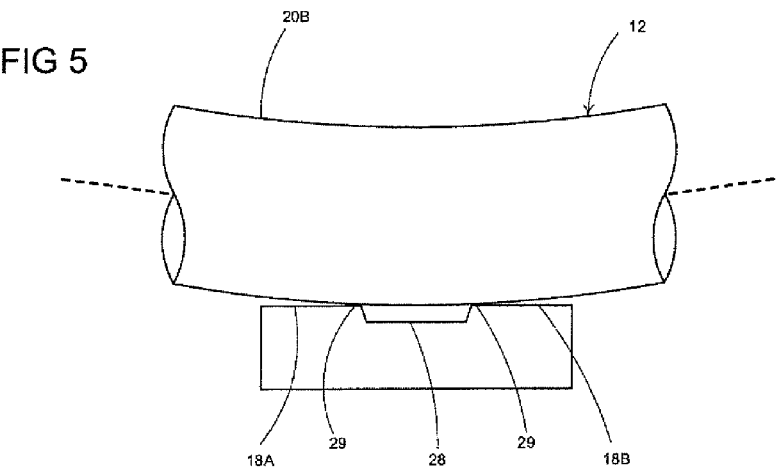

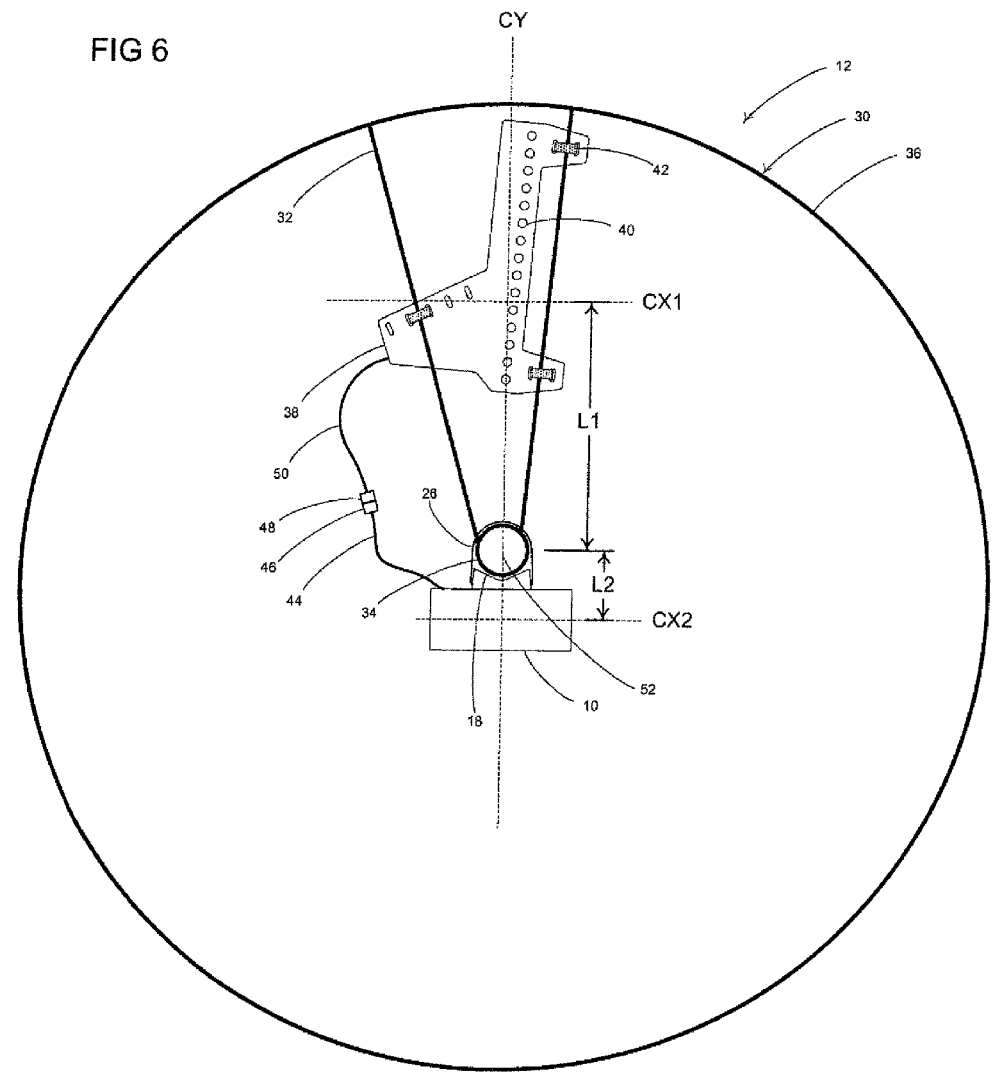

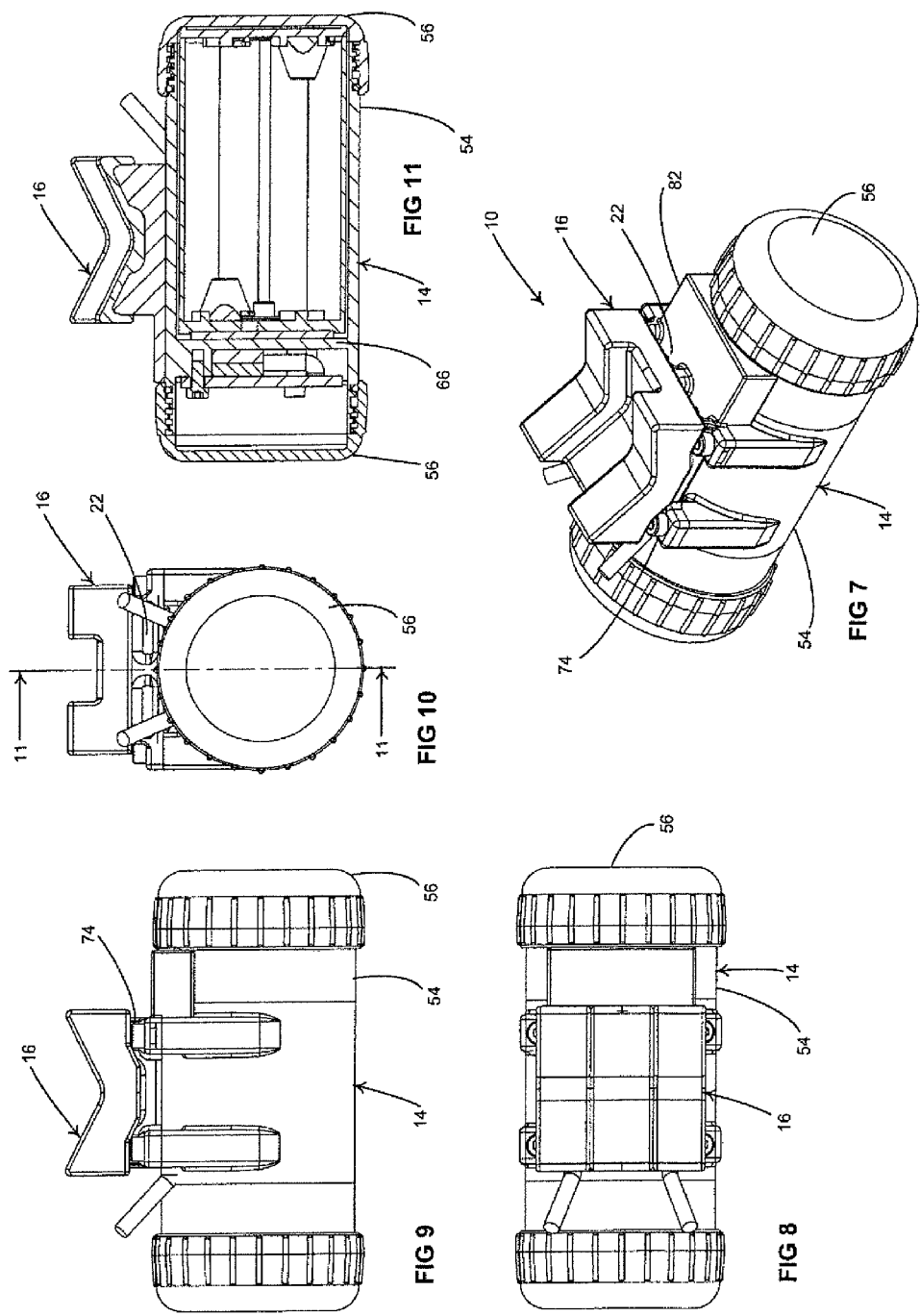

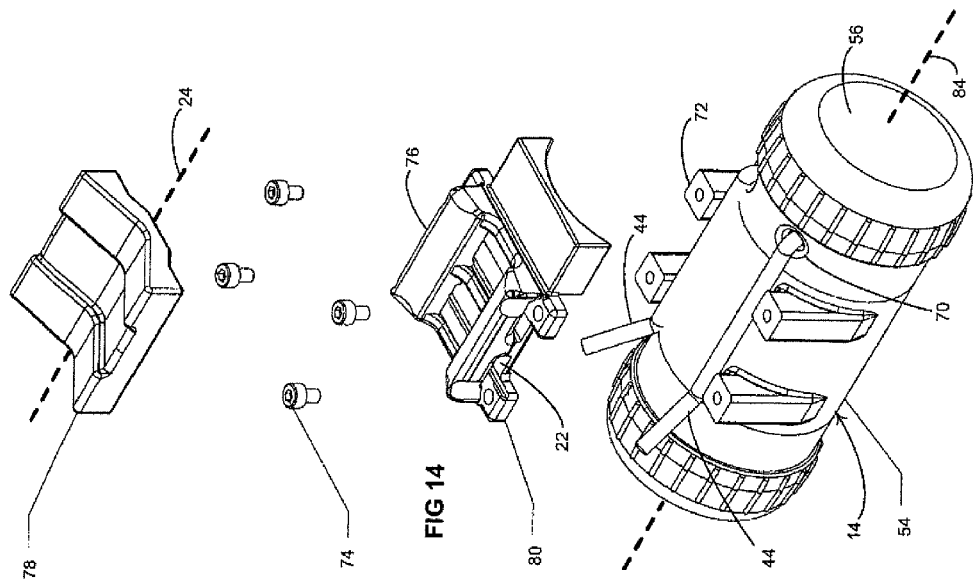
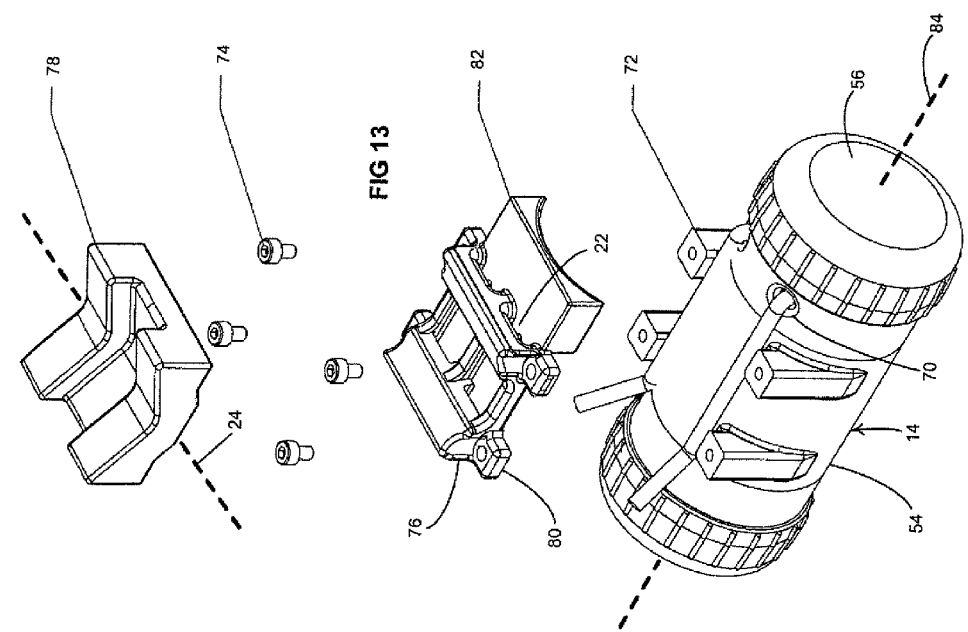

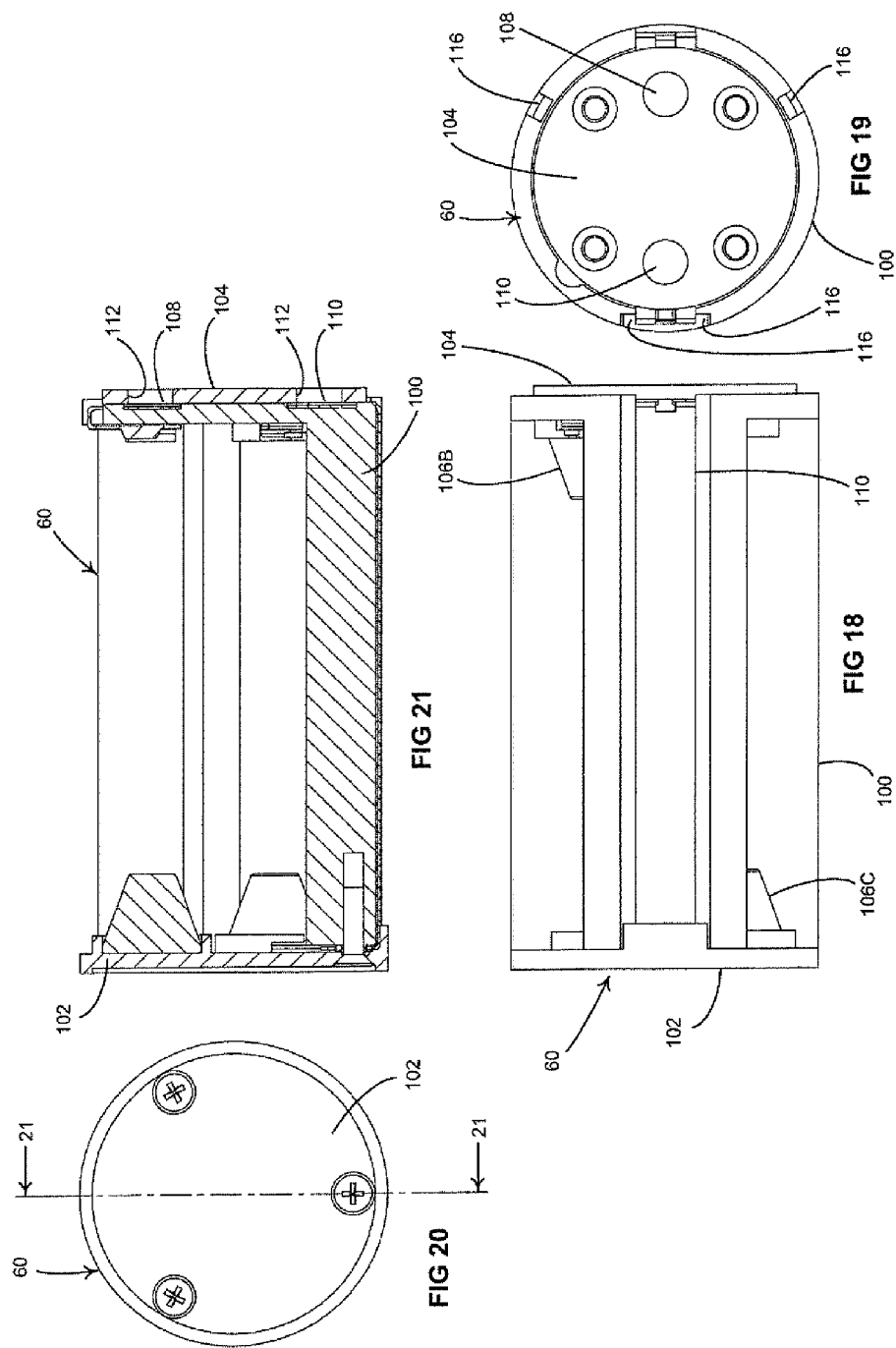

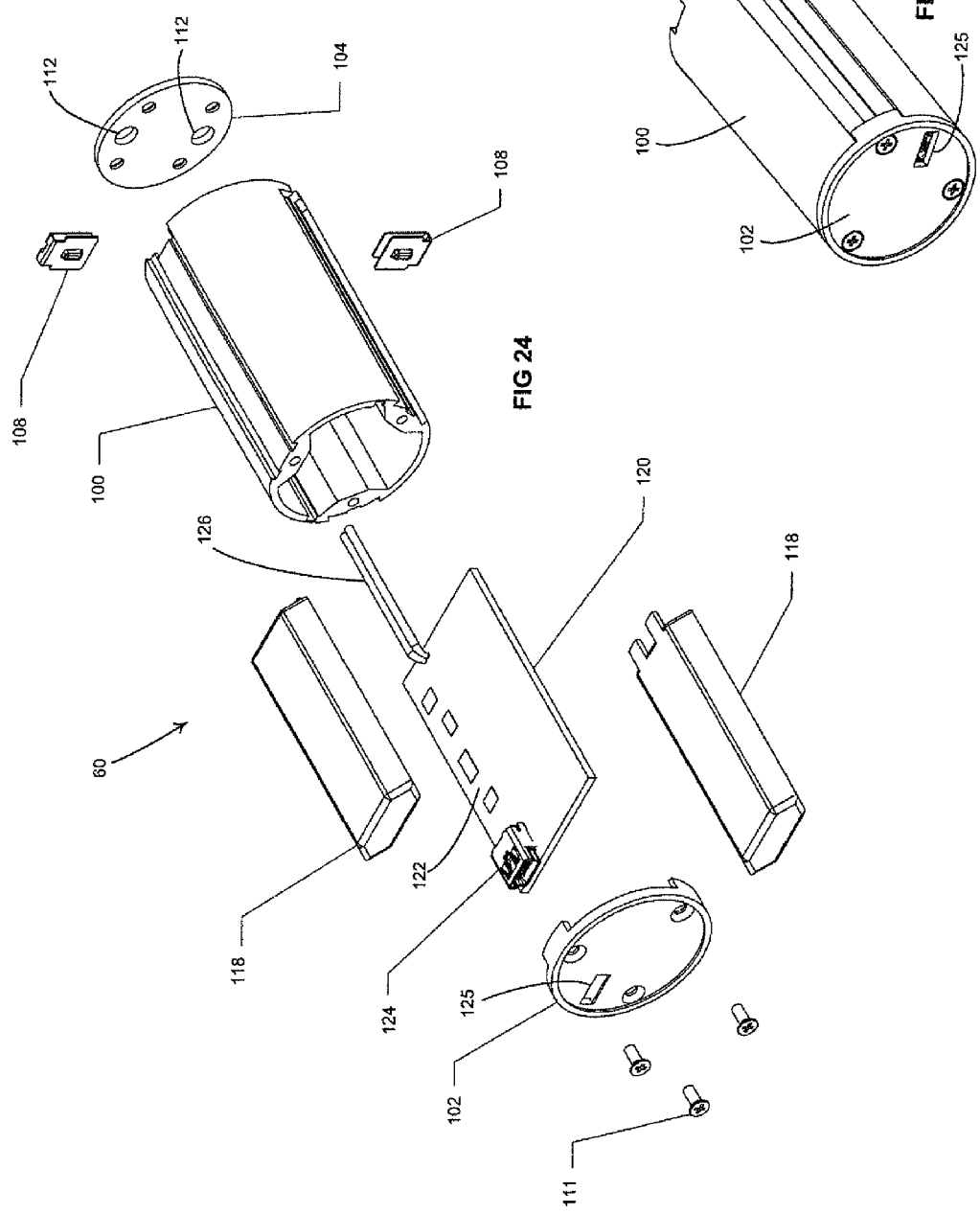

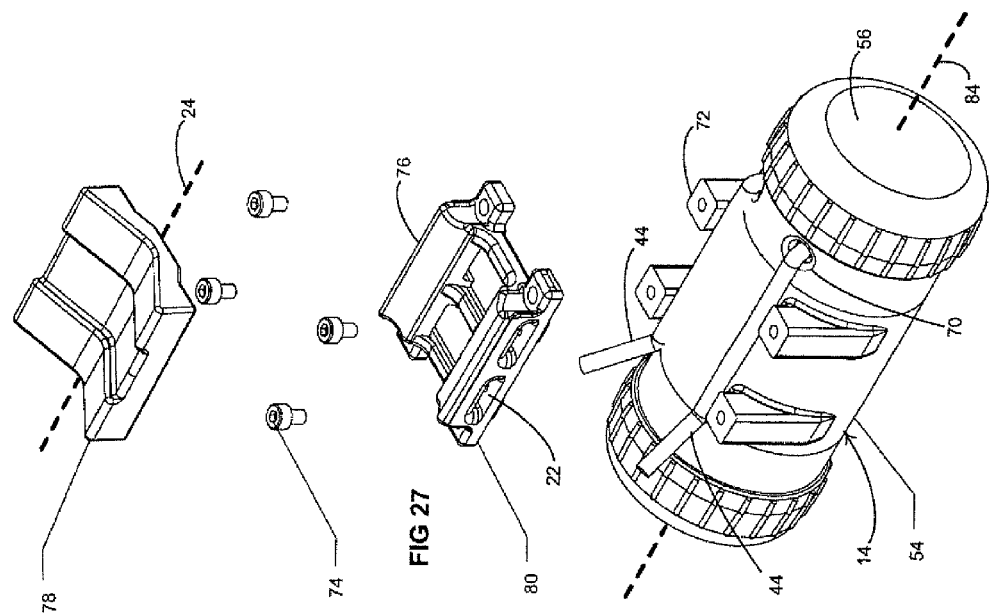
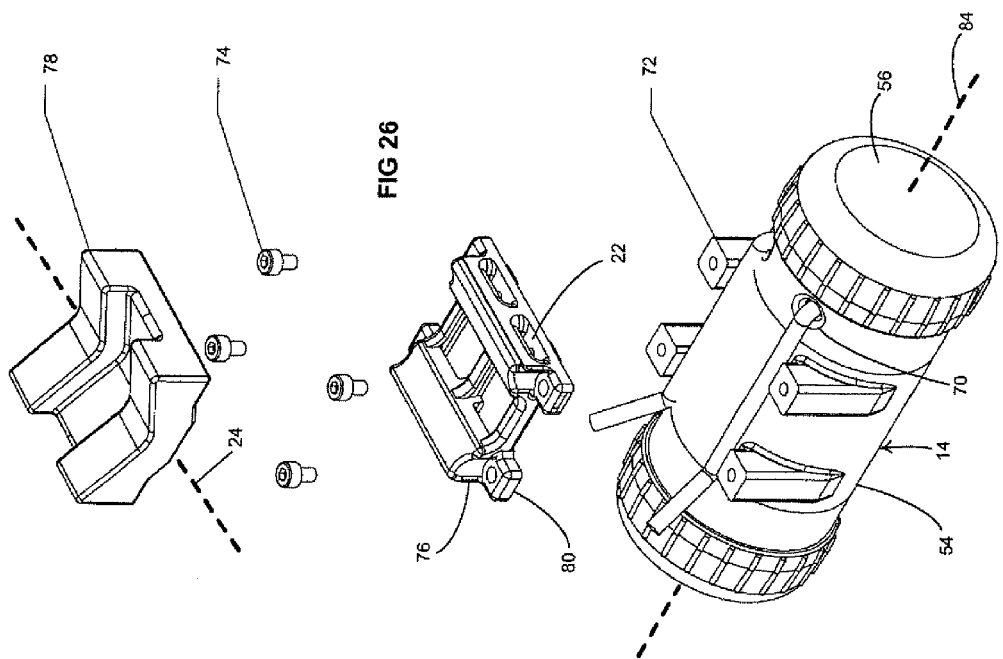

UNIVERSAL MOUNT BATTERY HOLDER FOR BICYCLES

CROSS-REFERENCE TO RELATED APPLICATIONS

This application is a continuation in part of U.S. patent application Ser. No. 13/187,588 filed on Jul. 21, 2011, now U.S. Pat. No. 8,789,988 the disclosure of which is expressly incorporated herein in its entirety by reference.

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The field of the present invention relates to mounts for attaching accessories to bicycle frames and wheels and, more particularly, to such mounts that attach the accessories to a wide range of different diameters and shapes of components of the bicycle frames and wheels.

BACKGROUND OF THE INVENTION

Battery-powered accessories such as headlamps, tail lamps, and the like have been designed for use with bicycles since at least as early as 1900. Most battery-powered accessories designed for use with bicycles incorporate the battery and accessory in a single integrated unit such as a headlamp or tail lamp. In these specific applications, the integrated unit including the battery holder is generally designed for a specific mounting location on the bicycle (such as the handlebar for a headlamp), and as a result is generally designed for mounting only at that specific location. For example, handlebar-mounted, battery-operated headlamps are very common and typically incorporate a mount that can only be secured to a tube having a diameter in the limited range of 20 mm to 30 mm which are the typical diameters for bicycle handlebars. Furthermore, it is not possible to use the batteries in a typical integrated headlamp or tail lamp to power any separate device. Some bicycle accessories have separate battery holders that are mounted separate from the powered accessory—again most common are headlamps and tail lamps. Some of these separate battery holders are designed to mount to the frame tubing of the bicycle. These previous devices, however, are limited in where they can be mounted on the bicycle and/or the types of bicycles to which they can be mounted.

U.S. Pat. No. 559,801 to Hoffman, the disclosure of which is expressly incorporated herein in its entirety by reference, shows a handlebar-mounted headlamp with a separate battery holder. The battery holder mounts using straps that are specifically designed for fitting the corner between the top tube and head tube of the bicycle frame. This was a convenient mounting location for a headlamp on a bicycle of that time. Today's bicycles feature a wide range of frame designs and geometries, such that this type of battery holder mount would not be assured to fit on all modern bicycles.

U.S. Pat. No. 1,439,430 to Lyhne, the disclosure of which is expressly incorporated herein in its entirety by reference, shows a weatherproof battery holder for bicycles that clamps to a frame tube. The invention includes a metal mounting strap permanently attached to the device. The battery holder is generally round and is strapped to a generally round bicycle tube. No provision is described for preventing the holder from sliding or rotating or twisting out of place after being attached, which is an inherent problem of clamping two round (cylindrical) objects together parallel to each other. Also, no provision is described for attaching the holder to bicycle frame tubing of significantly different sizes.

U.S. Pat. No. 4,339,060 to Braida, Jr., the disclosure of which is expressly incorporated herein in its entirety by reference, shows a battery holder that clamps to a frame tube with a metal adjustable-length clamp. However, the portion of the holder that contacts the bicycle frame is curved to match what is described as a "typical" bicycle frame tube. This overcomes some of the mounting limitations of the Lyhne invention. However, modern bicycles have a wide range of frame tube sizes and shapes, so this battery holder will not fit many modern bicycle frame tubes as it must inherently be curved to fit a particular diameter of frame tube. The holder is also designed to hold a single large, square 6 volt lantern battery which is far too large to be mounted in many of the locations such as, for example, the hub of a wheel, between the rear wheel and the bicycle frame tube, on a rear stay, or on the handlebar.

U.S. Pat. No. 4,597,031 to Tsuyama, the disclosure of which is expressly incorporated herein in its entirety by reference, shows a clamp with an integrated strap allowing a range of tubing sizes to be clamped. However, the strap must be long enough to accommodate the maximum tubing size to be attached, and this means when a significantly smaller tube is attached the excess strap will flap around or require bundling. Alternatively, the excess strap can be cut off, precluding any later re-attachment to a larger tube.

U.S. Pat. No. 6,572,249 to Bailey, the disclosure of which is expressly incorporated herein in its entirety by reference, shows another type of integrated strap which is in common use today, and having similar limitations to the Tsuyama design. This strap also has a small size of contact area between the device and the mount, so it is only suitable for attachment of relatively small and light weight items.

U.S. Pat. No. 626,627 to Middlekauff, the disclosure of which is expressly incorporated herein in its entirety by reference, shows a battery holder and lamp which connects to a bicycle with a clamp. The clamp is not well described, but appears to be a C-clamp. This type of clamp can only fit a limited range of tubing sizes (typically within 20% of the design size). Fitting additional smaller diameters requires an insert be placed between the tubing and the clamp. Fitting additional diameters larger than the design size is not possible with this type of clamp.

U.S. Pat. No. 4,736,921 to Zane, the disclosure of which is expressly incorporated herein in its entirety by reference, shows a type of C-clamp which is commonly used today for bicycle accessories. This type of clamp requires screws and nuts to attach to the frame, which can be relatively expensive. Also, this type of clamp can only fit a limited range of tubing sizes. This attachment method is widely used despite its limitations. For example see U.S. Pat. No. 6,446,922 to hie and U.S. Pat. No. 6,431,422 to Moore, the disclosures of which are expressly incorporated herein in their entireties by reference, that show other uses of this type of clamp with a bicycle accessories.

U.S. Pat. No. 5,332,183 to Kagayama, the disclosure of which is expressly incorporated herein in its entirety by reference, shows a style of clamp that is also common today for mounting headlamps with integrated batteries to a bicycle handlebar. This type of clamp, like the c-clamp discussed above is limited in the range of tube sizes to which it can be attached, and requires inserts to fit smaller tube sizes.

U.S. Pat. No. 6,568,838, the disclosure of which is expressly incorporated herein in its entirety by reference, shows a handlebar-mounted light with a cam-locking clamp. This type of clamp is expensive and can't accommodate as wide a range of tube sizes.

U.S. Pat. No. 5,597,225 to Davis, the disclosure of which is expressly incorporated herein in its entirety by reference, shows a battery holder designed to fit the water-bottle holder of a common bicycle. This is convenient for some applications, however it generally requires that the battery be nearly as large as a common bicycle water bottle and prevents free use of the water-bottle holder for holding water bottles. Water bottle holders are also present on most bicycles in only one or two locations, which may not be the desired location for a battery or other accessory—for example, this location may require a considerably longer wire to reach the powered device.

U.S. Pat. No. 6,286,982 to Tashiro and U.S. Patent Publication Number 2009/0261134 A1 to Tetsuka et al., the disclosures of which are expressly incorporated herein in their entireties by reference, show battery holders that mount to bolt holes in the bicycle frame. Thus the mounting location is limited to available bolt holes in the frame.

U.S. Pat. No. 4,135,229 to Modurkay, the disclosure of which is expressly incorporated herein in its entirety by reference, shows a bicycle wheel light with hub-mounted battery holder. The round battery holder is strapped to the round hub in a way which does not fix the battery holder from rotating and sliding around.

U.S. Pat. No. 5,121,305 to Deed, the disclosure of which is expressly incorporated herein in its entirety by reference, shows a bicycle wheel light with hub-mounted battery holder. The battery holder is of a clamp-on type so it can only be secured to a limited range of hub diameters.

While these prior accessory mounts may be effective at mounting to a specific location of a specific bicycle, they are not effective at attaching accessories to a wide range of different diameters and shapes of components of a wide variety of different bicycle frames and wheels. Accordingly, there is a need in the art for an improved bicycle accessory mount.

SUMMARY OF THE INVENTION

The present invention provides a universal mounting battery holder for a wheeled vehicle such as a bicycle and a process for making the same that overcomes at least one of the above-noted problems of the prior art. Disclosed is an accessory for attachment to a wheeled vehicle having frame tubing. The accessory comprises, in combination, a body portion and a mounting portion secured to the body portion and having a V-shaped groove for receiving the tubing. The groove has first and second portions separated by a notch to engage curved tubing with at least two contacts.

Also disclosed is an accessory for attachment to a wheeled vehicle having frame tubing. The accessory comprises, in combination a body portion and at least two mounting portions interchangeably securable to the body portion for mounting the body portion to the frame tubing in different orientations relative to the tubing.

Also disclosed is a wheeled vehicle comprising, in combination, a frame comprising tubing, a wheel having a hub, an accessory having a mounting portion with a V-shaped groove engaging one of the tubing and the hub, and at least one cable tie encircling at least one of the tubing and the hub and at least a portion of the mounting portion of the accessory to secure the accessory to one of the tubing and the hub.

Also disclosed is a wheel comprising, in combination, a hub, a rim, at least one spoke connecting the hub and the rim, a light unit secured to the at least one spoke, and a battery holder secured to the hub and electrically connected to the light unit. The battery holder is secured to the hub on an opposite side of the hub from the light unit to at least partially offset weight of the light unit.

Also disclosed is a battery holder for attachment to a wheeled vehicle. The battery holder comprises, in combination, a body portion forming a water-tight interior space for holding at least one battery and a mounting portion secured to the body portion for mounting the body portion to the wheeled vehicle. A pair of power cables have first ends operably connected to the at least one battery within the interior space and extend through openings in the body portion so that second ends opposite the first ends are located outside the body portion. A pair of seal members are located at the openings and the power cables extend between the seal members to seal the openings.

Also disclosed is a battery holder for attachment to a wheeled vehicle. The battery holder comprises, in combination, a body portion forming a water-tight interior space for holding at least one battery and a mounting portion removably secured to the body portion for mounting the body portion to the wheeled vehicle. A pair of power cables have first ends operably connected to the at least one battery within the interior space and extend through openings in the body portion so that second ends opposite the first ends are located outside the body portion. The power cables extend between the body portion and the mounting portion. Strain reliefs are formed for the power cables when the power cables are compressed between the body portion and the mounting portion.

Also disclosed is a battery holder for attachment to a wheeled vehicle. The battery holder comprises, in combination, a body portion forming a water-tight interior space, a mounting portion removably secured to the body portion for mounting the body portion to the wheeled vehicle, and an inner capsule located within the interior space for holding at least one battery and removable from the body portion. The removable inner capsule is configured to hold rechargeable lithium batteries.

From the foregoing disclosure and the following more detailed description of various preferred embodiments it will be apparent to those skilled in the art that the present invention provides a significant advance in the technology and art of bicycle accessory mounts. Particularly significant in this regard is the potential the invention affords for providing an easy to install, durable, reliable, and relatively inexpensive bicycle accessory mount that can be easily installed to a wide range of diameters and shapes of bicycle frames and components. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 4 is a schematic end view similar to FIG. 3 but showing the accessory with an alternative mounting portion which is secured to a curved bicycle frame tube.

FIG. 5 is a schematic view similar to FIG. 4 but with portions of the accessory removed for clarity to show contact points between the accessory and the curved tube.

FIG. 6 is a schematic view of the accessory of FIG. 1 in the form of a battery holder secured to a bicycle wheel and powering and an LED light device also secured to the bicycle wheel.

FIG. 7 is a perspective view of the battery holder of FIG. 1.

FIG. 8 is a top plan view of the battery holder of FIG. 7.

FIG. 9 is a side elevational view of the battery holder of FIGS. 7 and 8.

FIG. 10 is an end elevational view of the battery holder of FIGS. 7 to 9.

FIG. 11 is sectional view taken along line 11-11 of FIG. 10.

FIG. 13 is a partially exploded perspective view of the battery holder of FIGS. 7 to 9 showing a body portion having removable mounting portion.

FIG. 14 is a partially exploded view similar to FIG. 13 but showing an alternative mounting portion wherein the body portion is oriented ninety degrees relative to the embodiment of FIG. 13.

FIG. 18 is a side elevational view of a battery capsule of the battery holder of FIGS. 7 to 13 for holding standard AA batteries.

FIG. 19 is an end elevational view of the battery capsule of FIG. 18.

FIG. 20 is another end elevational view of the battery capsule of FIGS. 18 and 19.

FIG. 21 is a sectional view taken along line 21-21 of FIG. 20.

FIG. 23 is a perspective view of an alternative battery capsule having permanently installed rechargeable lithium batteries.

FIG. 24 is an exploded perspective view of the battery capsule of FIG. 23.

FIG. 26 is a partially exploded perspective view similar to FIGS. 13 and 14 but showing a removable mounting portion configured to be mountable in a plurality of different orientations.

FIG. 27 is a partially exploded view similar to FIG. 26 but showing the removable mounting portion in an orientation perpendicular to that shown in FIG. 26.

Figure 1:
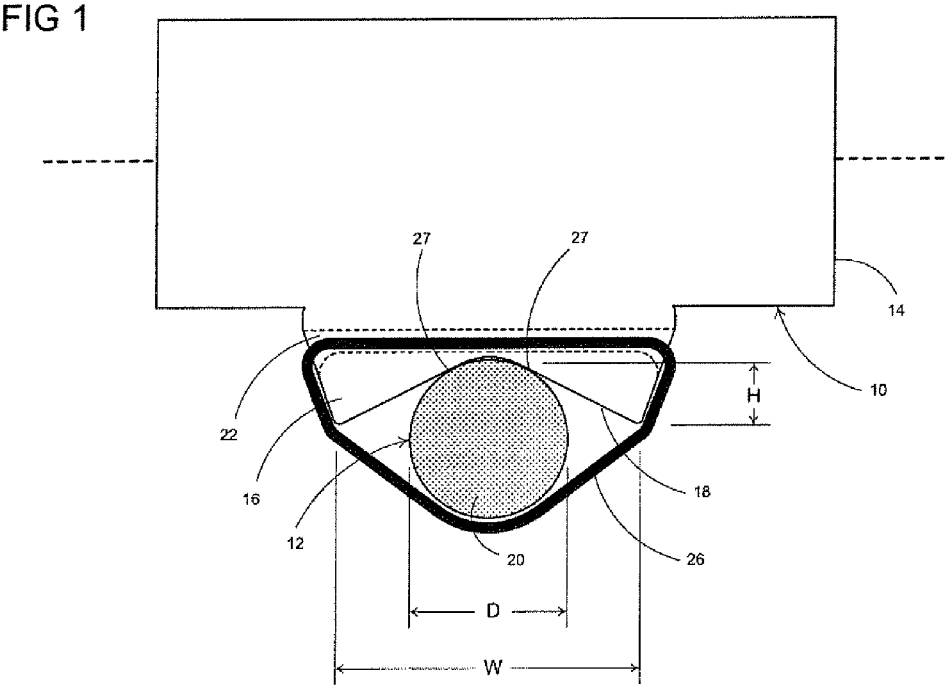
FIG. 1 is schematic side view of an accessory secured to a bicycle frame tube according to the present invention.

It should be understood that the appended drawings are not necessarily to scale, presenting a somewhat simplified representation of various preferred features illustrative of the basic principles of the invention. The specific design features of the accessories as disclosed herein, including, for example, specific dimensions, orientations, and shapes will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the components illustrated in the drawings.

DETAILED DESCRIPTION OF CERTAIN PREFERRED EMBODIMENTS

It will be apparent to those skilled in the art, that is, to those who have knowledge or experience in this area of technology, that many uses and design variations are possible for the bicycle accessory mounts disclosed herein. The following detailed discussion of various alternative and preferred embodiments will illustrate the general principles of the invention with reference to battery holders suitable for use on a bicycle. However, other embodiments suitable for other applications will be apparent to those skilled in the art given the benefit of this disclosure such as, for example, other wheeled vehicles including but not limited to motorized cycles, motor scooters, wheelchairs, tricycles, and baby carriages.

Figure 3:
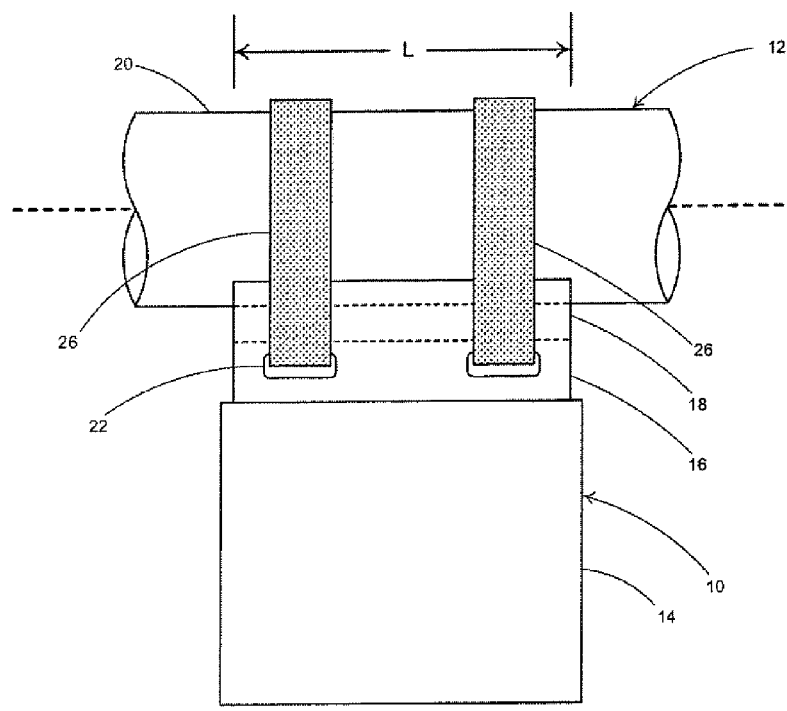
FIG. 3 is a schematic end view of the accessory of FIG. 1.
Figure 12:
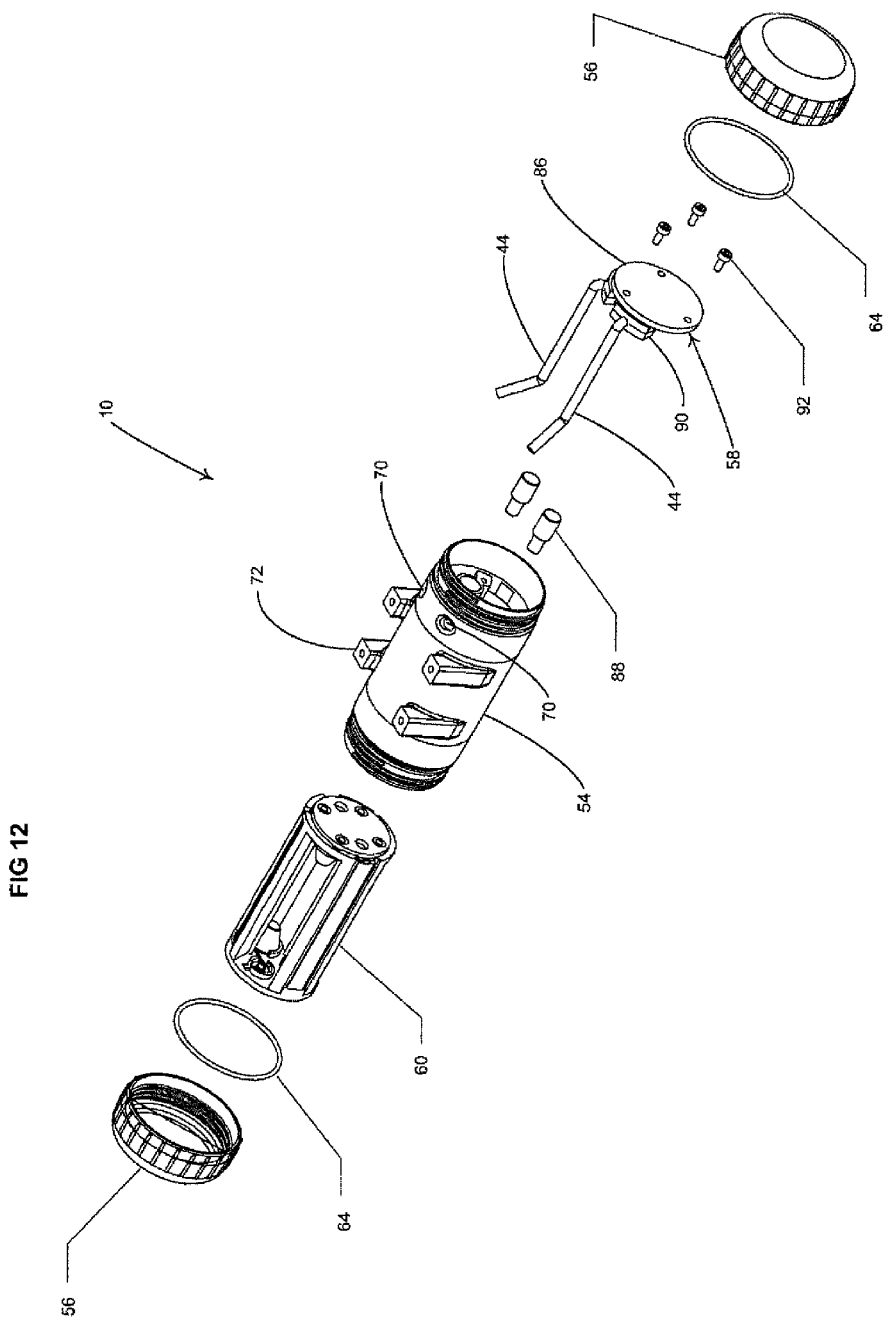
FIG. 12 is an exploded view of the battery holder of FIGS. 7 to 11 with some components removed for clarity.

FIGS. 1 and 3 illustrate an accessory in the form of a battery holder 10 for attachment to a wheeled vehicle such as a bicycle 12 according to the present invention. The illustrated battery holder 10 includes a body portion 14 and a mounting portion 16 secured to the body portion 14. The illustrated mounting portion 16 has a mounting groove 18 having a V-shaped cross-section and extending the full width of the mounting portion 16. The illustrated mounting groove 18 is sized and shaped to receive a circular-shaped or otherwise rounded frame tube or tubing 20 of the bicycle 12 therein. The illustrated mounting groove 18 has a pair of angled planar or flat contact surfaces forming an angle of about 130 degrees therebetween but any other suitable angle between the contact surfaces can alternatively be used. It is noted that the bottom of the mounting groove 18 can be truncated if desired but it may affect the range of tube diameters that can be stably mounted therein.

The illustrated mounting portion 16 has a pair of spaced apart openings 22 that extend entirely through the mounting portion 16 between the mounting groove 18 and the body portion 14. The openings 22 extend in a direction substantially perpendicular to the longitudinal axis 24 of the mounting groove 18 and are sized for receiving straps 26 therethrough. The straps 26 pass through the openings 22 and encircle a portion of the mounting portion 16 and the frame tube 20 of the bicycle 12 and are tightened to compress the frame tube 20 tightly into the mounting groove 18. Secured in this manner, two points of contact 27 (in cross-section, or lines of contact extending in the longitudinal direction of the tube) are formed between the mounting groove 18 and the round frame tube 20 to create a stable mount that does not rock back and forth on the round tube 20. The illustrated straps 26 are plastic cable ties or tie straps which often comprise Nylon and are commonly used to bundle electrical wires and cables but the straps 26 can alternatively be metal pipe clamps or any other suitable type of strap.

Figure 2:
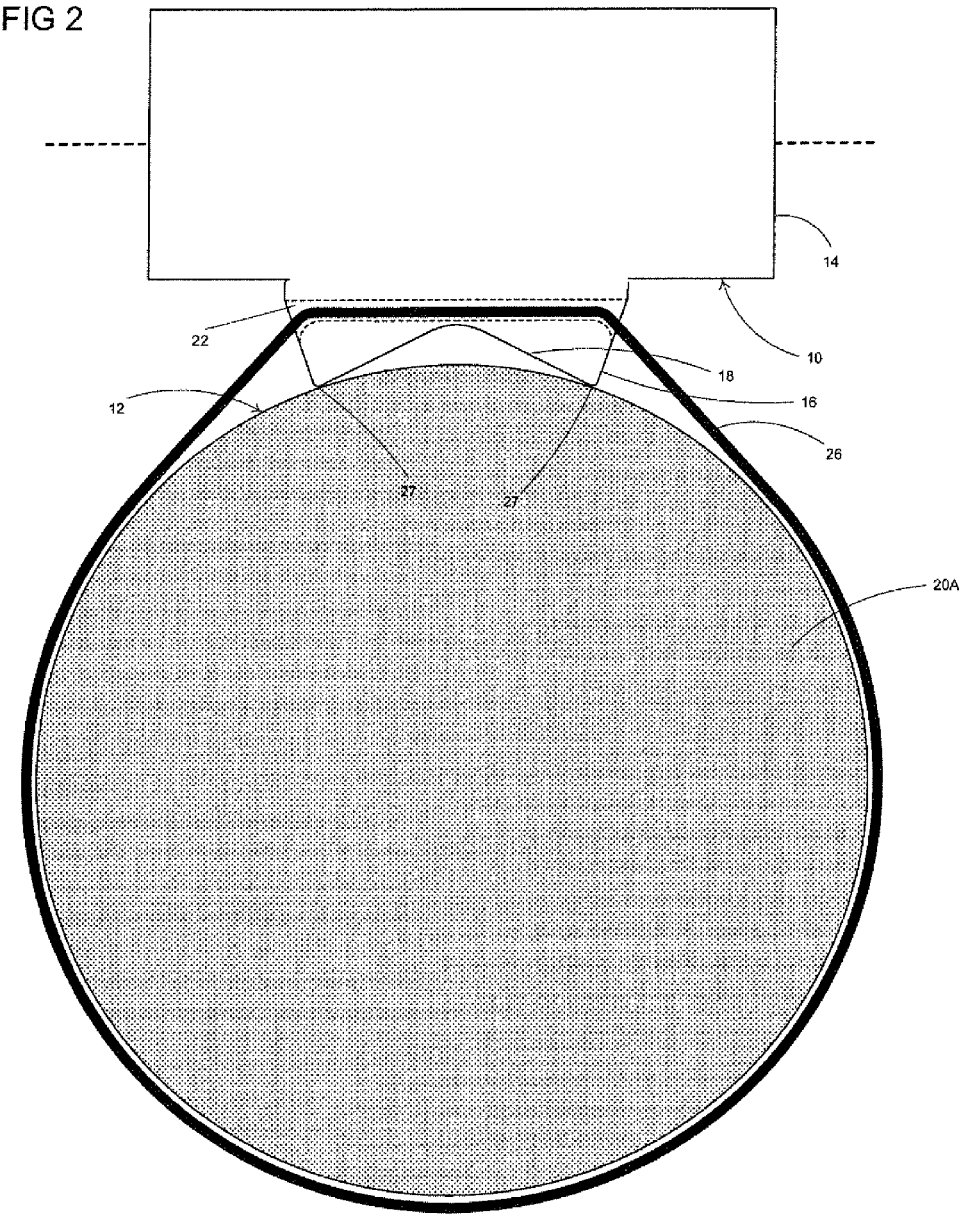
FIG. 2 is a schematic side view of the accessory of FIG. 1 secured to a bicycle frame tube having a larger diameter than the bicycle frame tube in FIG. 1.

The tube 20 shown in FIG. 1 has a diameter D which is approaching the minimum diameter that can be stably mounted on the illustrated mounting groove 18 of the mounting portion 16. The illustrated groove 18 has a height H of about 0.5 D and a width W of about 2 D. FIG. 2 illustrates the same battery holder 10 attached to a tube 20A having a diameter of about 6 D which is approaching the maximum diameter that can be stably mounted on the illustrated mounting groove 18 of the mounting portion 16. As can be seen, the maximum sized tube 20A shown FIG. 2 has a diameter approximately six times larger than the minimum sized tube 20 shown in FIG. 1. This is a much larger range of tubing diameters that can be mounted stably on a single mount compared to other clamping methods seen in prior art and using less material to construct than other methods as well. The illustrated mounting groove 18 can advantageously be sized for stably mounting to bicycle tube diameters in the range of about 10 mm to 60 mm but it is noted that any other suitable range of tube diameters can be alternatively utilized.

As best shown in FIG. 3, the illustrated mounting groove 18 has a length L of about 2 D. It is noted, however, that the length L of the mounting groove 18 can be shorter or longer as suitable for a specific application. It is also noted that while the illustrated mounting portion 16 utilizes two of the straps 26, a single strap 26 or more than two straps 26 can alternatively be utilized. The length of the mounting groove 18 and number of straps 26 is typically designed based on the weight of the attached battery holder 10 and expected load and vibration of the particular application.

FIGS. 4 and 5 illustrate a variation of the mounting portion 16 wherein the contact surfaces of the mounting groove 18 are split by a laterally extending notch or groove 28 to form longitudinally spaced-apart first and second mounting groove portions 18A, 18B. The notch 28 forms a central portion which is stepped below the contact surfaces to provide stable attachment of a slightly curved tube 20B as is often found on bicycles 12. The split mounting groove 18 permits two points of contact 29 in the longitudinal direction with the bent tube 20B for stability by allowing the tube 20B to extend below the contact surfaces between the first and second groove portions 18A, 18B. If a wider range of tubing bends is desired to be mounted, the notch 28 can also have V-shape as well. However, the degree of tube bending on bicycles 12 is typically very small relative to the size of the battery holder 10.

FIG. 6. illustrates a bicycle wheel 30 having spokes 32 extending between a central hub 34 and an outer rim 36. A lighting unit 38 having a plurality LED lights 40 is secured to the spokes 32. The illustrated lighting unit 38 is attached to the spokes 32 with straps 42. A suitable lighting unit 38 is described in U.S. patent application Ser. No. 12/478,82, the disclosure of which is expressly incorporated herein in its entirety by reference. It is noted that the lighting unit 38 can be of any suitable type, can be attached to the spokes 32 or any other portion of the wheel 30 in any suitable way, and can have any number of LEDs 40 or other lights arranged in any suitable way. A separate battery holder 10 is attached to the hub 34 as described above to provide power to the lighting unit 38. The illustrated battery holder 10 has a power cable 44 with a connector 46 mated to a connector 48 of a power cable 50 of the lighting unit 38 to provide electrical power thereto. It is noted that the battery holder 10 and the lighting unit 38 may be joined by any suitable quantity of power cables 44 with or without connectors 46 as suitable for a particular application.

The illustrated battery holder 10 is attached to the hub 34 on a side of the hub 34 directly opposite the lighting unit 38. That is, the center of mass CX1 of the lighting unit 38 and the center of mass CX2 of the battery holder 10 are both aligned along a line CY which extends through the axis of rotation 52 of the wheel 30. This configuration of the battery holder 10 and the lighting unit 38 on the wheel 30 greatly reduces or eliminates any imbalance in the rotating wheel 30 caused by the wheel-mounted lighting unit 38. The imbalance is defined by (L1×M1)−(L2×M2), where: L1 is the distance from the axis of rotation 52 to the center of mass CX1 of the lighting unit 38; L2 is the distance from the axis of rotation 52 to the center of mass CX2 of the battery holder 10; M1 is the mass of the lighting unit 38; and M2 is the mass of the battery holder 10. When the total of this equation equals zero, the wheel 30 is perfectly balanced. Even if the wheel 30 is not perfectly balanced, the imbalance can be greatly reduced through this combination of a lighting unit 38 without on-board batteries and a hub-mounted battery holder 10 that is positioned opposite the lighting unit 38. Even though bicycle wheels 30 vary in their construction and precise dimensions, it is possible to perfectly balance the wheel 30 by placing rubber spacers between the mounting groove 18 of battery holder 10 and the hub 34 of the wheel 30 to adjust the distance L2 and/or to attach the lighting unit 38 at a different radial position along the spokes 32 of the wheel 30 to adjust the distance L1.

FIGS. 7 to 13 illustrate an accessory in the form of a battery holder 10 according to the present invention. It is noted, however, that the accessory 10 can alternatively hold any other suitable component(s) and/or have any other suitable purpose. The illustrated battery holder 10 includes the body portion 14 and the mounting portion 16 removably secured to the body portion 14. The illustrated body portion 14 includes a shell or body 54, a pair of end caps 56, a wire assembly 58, and a removable inner capsule 60 for holding a plurality of batteries.

The illustrated body 54 is a generally circular tube having threaded ends for removably securing the threaded end caps 56 thereon to form a hollow interior space 62. The illustrated body 54 and the end caps 56 are molded of a generally rigid plastic but they can alternatively be formed in any other suitable way and/or can comprise any other suitable material. The end caps 56 cooperate with O-ring seals 64 to form a water-tight seal so that the hollow interior space 62 is water-tight to prevent the entrance of water or other liquids into the interior space 62. The illustrated body 54 includes an interior wall 66 near a rear end of the body 54 that separates the interior space 62 into forward and rearward portions. The forward portion of the interior space 62 is sized for cooperating with the removable inner capsule 60 as discussed in more detail below and the rear portion of the interior space 62 is sized for cooperating with the wire assembly 58 as discussed in more detail below. The illustrated interior wall 66 has a pair of laterally spaced apart openings 68 formed therein for permitting electric contact between the wire assembly 58 and the inner capsule 60 as described in more detail below. A pair of laterally spaced apart openings 70—are also provided in the top of the wall of the body 54 at the rearward portion of the interior space 62 to cooperate with the wiring assembly 58 as described in more detail below. Centrally located on the top of the body 54 are mounts 72 for receiving the mounting portion 16. The illustrated mounts 72 included threaded openings for receiving threaded fasteners to removably secure the mounting portion 16 to the body 54 of the body portion 14 but it is noted that the mounts 72 can alternatively take any other suitable form for cooperating with the mounting portion 16.

The illustrated mounting portion 16 includes an attachment member 76 and a separate cap member 78 secured thereto. The illustrated attachment member 76 includes mounting flanges 80 for engaging the mounts 72 of the body 54 and openings are provided therein for receiving the threaded fasteners 74 that rigidly and removably secure the mounting portion 16 to the body portion 14. The upper side of the attachment member 76 is sized and shaped to support the cap member 78. A rearward end of the attachment member 76 forms a cover 82 sized and shaped to cover the openings 70 in the top of the body 54 to provide physical protection of the electrical cables and to prevent direct spray of water or other liquids to the openings 70 as described in more detail below. The illustrated attachment member 76 is molded of a generally rigid plastic but it can alternatively be formed in any other suitable way and/or can comprise any other suitable material. The illustrated cap member 78 forms the mounting groove 18 as discussed above in detail. The illustrated cap member 78 is molded of a generally resiliently flexible material such as rubber but it can alternatively be formed in any other suitable way and/or can comprise any other suitable material. The illustrated cap member 78 is secured to the attachment member 76 with adhesive but can alternatively be secured in any other suitable manner or can be integrally formed with the attachment member 76 such as by co-molding.

The illustrated mounting portion 16 includes a mounting groove 18 that extends in a lateral direction, that is, the mounting groove 18 extends in a direction such that the longitudinal axis 24 of the mounting groove 18 is substantially perpendicular to the longitudinal axis 84 of the body 54. It is noted, however, that the mounting groove 18 can alternatively extend in any other desired direction so as to align conveniently with other portions of the bicycle and not obstruct the function of other parts of the bicycle. FIG. 14 illustrates another mounting portion 16A that is substantially the same as the above described mounting portion 16 but the mounting groove 18 extends in the longitudinal direction, that is, the mounting groove 18 extends in a direction such that the longitudinal axis 24 of the mounting groove 18 is substantially parallel to the longitudinal axis 84 of the body 54. While the two illustrated mounting grooves 18 are oriented ninety degrees from one another, they can have any other orientations and/or further mounting portions 16 can be provided with other desired orientations. It is noted that when the mounting portion 16 is removably secured to body portion 14, a plurality of interchangeable mounting portions 16, 16A, each having a different orientation of the mounting groove 18, can be used with a single body portion 14 so that the user can adapt the orientation of the mounting groove 18 as needed for its desired use. FIGS. 26. and 27 illustrate an alternative mounting portion 16 that is substantially the same as the mounting portions 16 described above except that it is configured so that it can be mounted in a plurality of orientations. In the illustrated embodiment, the cover 82 is not formed as an integral one piece component with the attachment member 76. The cover 82 can be either eliminated or formed and secured as a separate component from the attachment member 76. The illustrated attachment member 76 is removably secured to the body portion 14 with the fasteners 74 such that the mounting groove 18 can be oriented either in an orientation perpendicular to the body portion (shown in FIG. 26) or in an orientation parallel to the body portion (shown in FIG. 27). While the illustrated mounting groove 18 can be mounted in two orientations that are ninety degrees from one another, it is noted that the grove 18 can alternatively be mountable any other suitable orientations and/or can alternatively be mountable in more than two orientations.

As best shown in FIGS. 12 and 15 to 17, the illustrated wire assembly 58 includes a contact plate 86, a pair of contact springs 88, a pair of power cables or wires 44, and a pair of seal members 90. The illustrated contact plate 86 is circular to closely fit within the body 54 and is secured to the interior wall 66 with screws 92 extending through openings in the contact plate 86 and into the interior wall 66 of the body 54. It is noted that the contact plate 86 can alternatively be secured within the body 54 in any other suitable manner. The illustrated contact plate 86 comprises a printed circuit board having a pair of laterally-spaced apart first contacts 94 which are positioned to be aligned with the openings 68 in the interior wall 66 of the body 54. The spring contacts 88 are positioned with their larger ends captured between the contact plate 86 and the interior wall 66 of the body 54 and in electrical contact with the first contacts 94 of the contact plate 86 and their smaller ends extending through the openings 68 in the interior wall 66 and in electrical contact with the inner capsule 60 located within the forward portion of the interior space 62. The illustrated contact plate 86 also has a pair of laterally-spaced apart second contacts 96 located near the bottom of the contact plate 86. The second contacts 96 are in electrical connection with the first contacts 94 through the printed circuit board.

Figure 15:
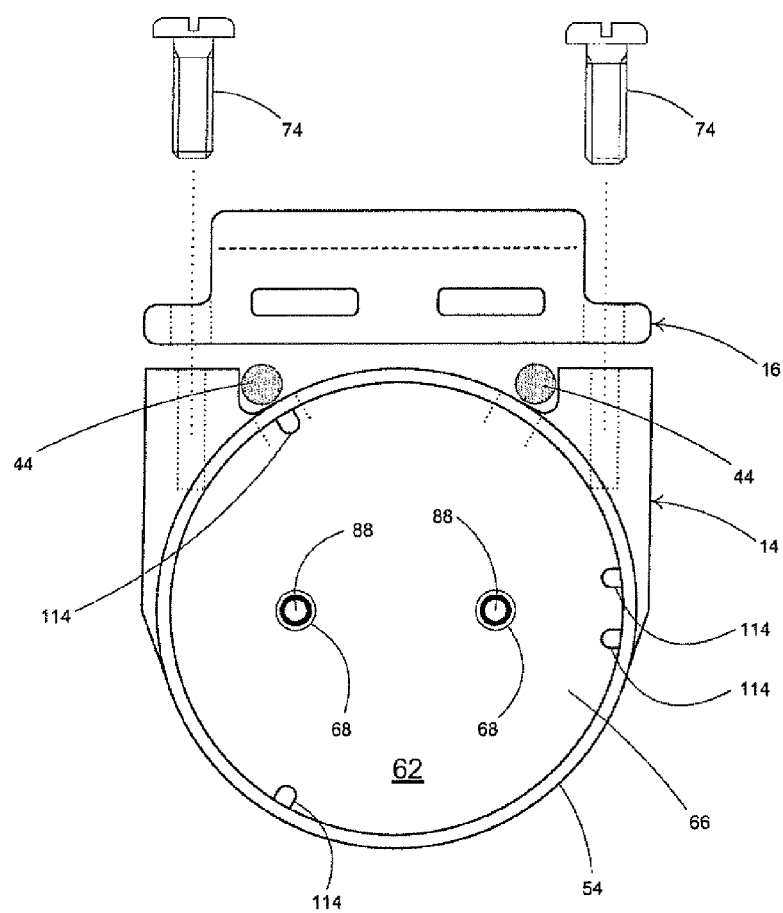
FIG. 15 is a schematic end view of the battery holder of FIGS. 7 to 13 showing compression of electrical wires by the mounting portion to form a stress relief for the wires.
Figure 17:
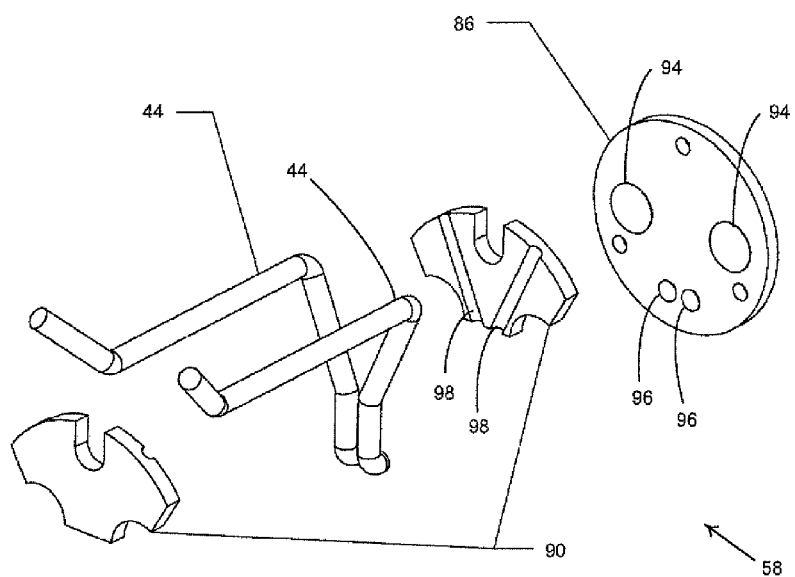
FIG. 17 is an exploded perspective view of the electrical wire subassembly of FIG. 16
Figure 16:
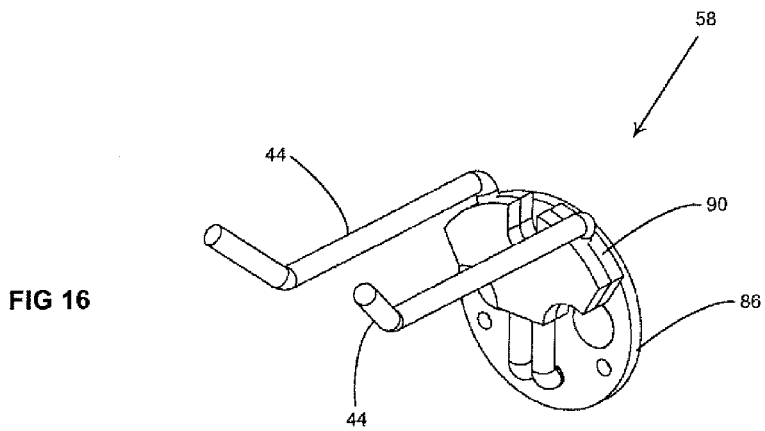
FIG. 16 is a perspective view of an electrical wire subassembly of the battery holder of FIGS. 7 to 13.
Figure 22:
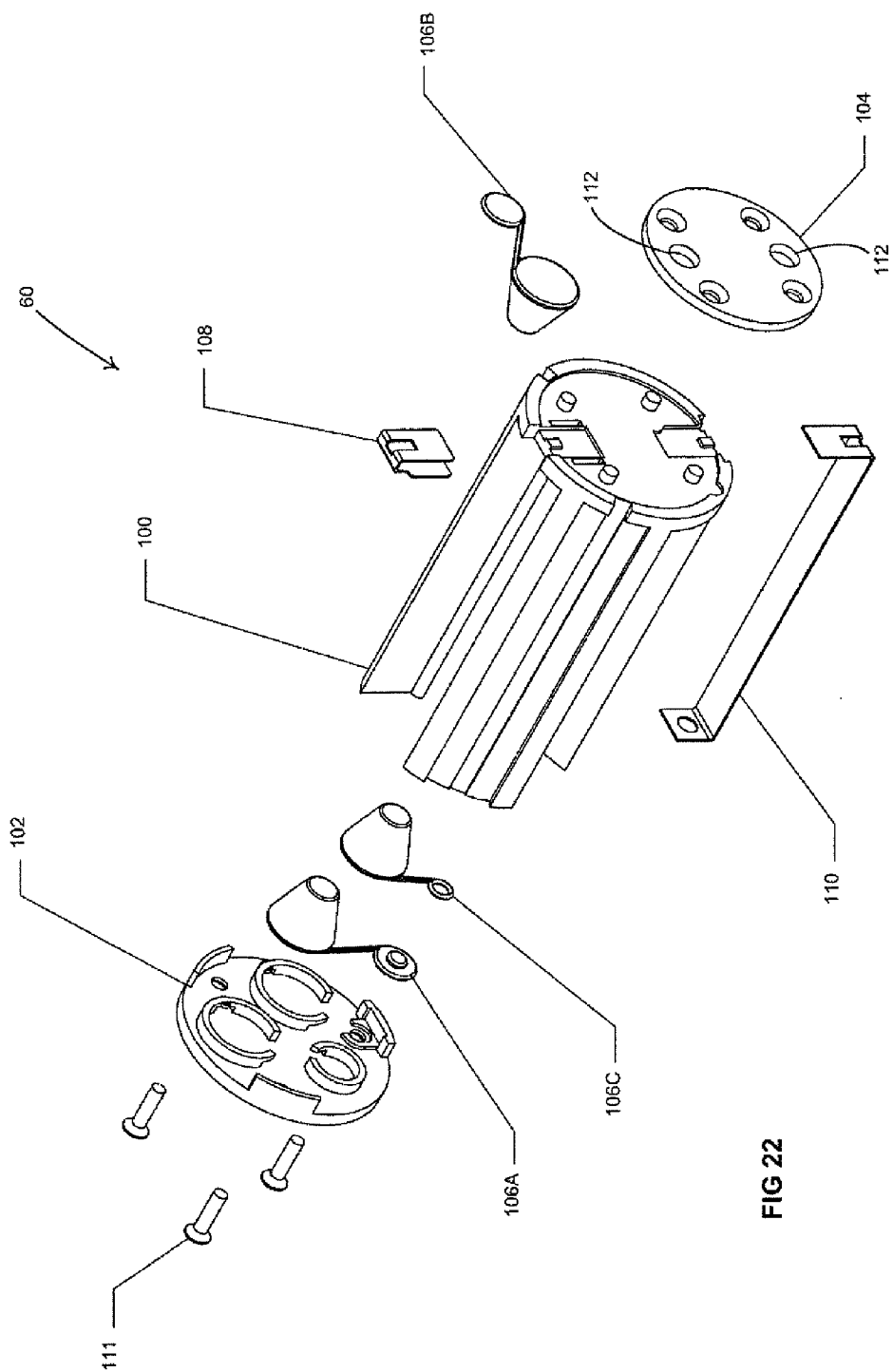
FIG. 22 is an exploded perspective view of the battery capsule of FIGS. 18 to 21.

The first ends of the power cables 44 are electrically connected to the second contacts 96 and vertically extend along the forward side of the contact plate 86 and pass through the openings 70 in the top of the body 54. Outside the body 54, the power cables 44 forwardly extend along the top of the body 54 between the body portion 14 and the mounting portion 16 so that second ends of power cables 44 extend in a generally forward direction from the body portion 14. The second ends of the power cables 44 can be directly connected to the device to be powered or can be provided with suitable connectors for removably connecting to the device to be powered. As best shown in FIG. 15, the illustrated power cables 44, the body 54, and the mounting portion 16 are sized and shaped so that the power cables 44 are compressed between the body 54 and the mounting portion 16 to form a strain relief for the power cables 44. That is, the rigid connection of the power cables 44 provided by the compression reduces or eliminates strain at the connection of the first ends of the power cables 44 to the contact plate 86 when the second ends are pulled.

The illustrated seal members 90 are each planer and stacked between the contact plate 86 and the interior wall 66 of the body 54 and are resiliently compressed therebetween. The power cables 44 extend between the seal members 90 through grooves 98 formed therein. The seal members 90 are formed of a resiliently flexible material such that when compressed about the power cables 44 and against the interior wall of the body 54 at the openings 70, a water-tight seal is formed at the power cables 44 passing through the openings 70. The cover 82 is located over the power cables 44 at the openings 70 in order to provide physical protection of the cables 44 and to prevent direct spray of water or other liquids at the seal members 90 to better ensure the seal members 90 prevent the entry of water or other liquids. While the illustrated seal members 90 are located within the interior space 62, it is noted that the seal members 90 can alternatively be located outside the interior space 62 but underneath the protective cover 82

FIGS. 18 to 22 illustrate the removable inner capsule 60 for holding the batteries. The illustrated inner capsule 60 is configured to hold three AA batteries or three AAA batteries but it is noted that it can alternatively be configured for any other suitable type and/or quantity of batteries. The illustrated inner capsule 60 includes a frame 100, a forward end cap 102, a rear end cap 104, three battery spring contacts 106, a contact 108, and a jumper contact 110. The illustrated frame 100 is sized and shaped to form three parallel and adjacent positions for the batteries and has openings associated with positions for insertion of the batteries therein. The illustrated frame 100 and end caps 102, 104 are molded of a generally rigid plastic but they can alternatively be formed in any other suitable way and/or can comprise any other suitable material. The illustrated forward end cap is removably secured to the frame 100 by screws 111 but can alternatively be secured in any other suitable manner. The illustrated rearward end cap 104 is secured to the frame 100 by heat welding but can alternatively be secured in any other suitable manner.

The first contact 108 is secured by the rear end cap 104 at the rearward end of the first battery position to form a positive contact for the first battery. The large portion of first spring contact 106A is secured to the forward end cap 102 at the forward end of the first battery position to form a negative contact for the first battery. The small portion of the first spring contact 106A is secured to the forward end cap 102 at the forward end of the second battery position to form a positive contact for the second battery. The large portion of the second spring contact 106A is secured to the rearward wall of the frame 100 at the rearward end of the second battery position to form a negative contact for the second battery. The small portion of second spring contact 106B is secured to the rearward wall of the frame 100 at the rearward end of the third battery position to form a positive contact for the third battery. The large portion of third spring contact 106C is secured to the forward end cap 102 at the forward end of the third battery position to form a negative contact for the third battery. The small portion of the third spring contact 106C is secured to the jumper contact 110 at the forward end cap 102. The jumper contact 110 extends from the forward end cap 102 to the rearward end of the frame 100 where it is secured by the rear end cap 104. Configured in this manner there is a continuous electrical path between the contacts 108, 110 when the three batteries are installed. The illustrated rear end cap 104 is provided with openings 112 at the contacts 106, 108 that are sized and shaped such that the spring contacts 88 of the wire assembly 58 engage the contacts 106, 108 of the inner capsule 60 when the inner capsule 60 is fully within the body 54. Thus there is a continuous electrical path between the second ends of the power cables 44 when the three batteries are installed in the inner capsule 60 and the inner capsule 60 is fully installed in the body 54.

In order to assure that the spring contacts 88 of the wire assembly 58 engage the contacts 106, 108 of the inner capsule 60 when the inner capsule 60 is within the body 54, the body 54 and the inner capsule 60 are keyed to require the proper orientation of the inner capsule 60 relative to the body 54 for insertion of the inner capsule 60 to take place. The illustrated key comprises ribs 114 within the interior space 62 of the body 54 (best seen in FIG. 15) and cooperating grooves or slots 116 in the inner capsule 60 (best seen in FIG. 19) It is noted however, that the key can alternatively have any other suitable form.

It should be appreciated that the above described configuration of the inner capsule 60 permits the inner capsule 60 to be entirely removed from the body 54 once the forward end cap 56 of the body 54 is removed because there is not a mechanical connection therebetween of any kind. Therefore multiple inner capsules 60 can be utilized and swapped as the batteries are discharged and/or the inner capsule 60 can be taken to a remote location to change the batteries if desired.

FIGS. 23 and 24 illustrate an alternative inner capsule 60A which is configured for holding rechargeable lithium batteries 118. This embodiment of the inner capsule 60 is substantially the same as the inner capsule 60 discussed above in detail except that it is configured for the rechargeable lithium batteries 118 rather than AA or AAA batteries. This embodiment illustrates that the inner capsule 60 can be configured for any suitable type and/or quantity of batteries. This inner capsule 60A includes two rechargeable lithium batteries 118 assembled onto a printed circuit board 120 which is configured with a charging circuit 122 and a standard USB charging port 124. The charging port 124 is accessible through an opening 125 in the forward end cap 102. A pair of wires or cables 126 extend from the circuit board 120 and are electrically connected to the contacts 106 at the rearward end cap 104.

Figure 25:
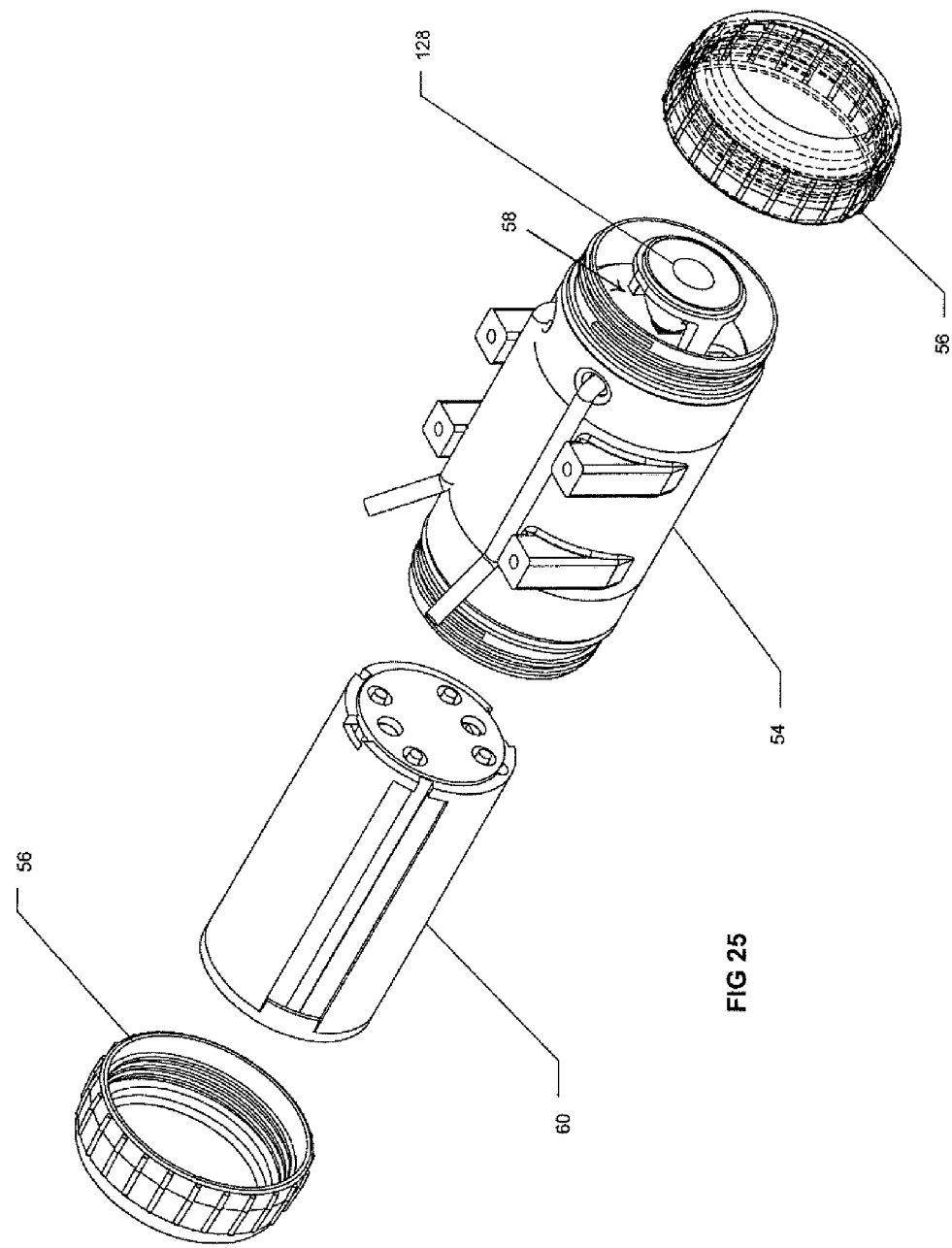
FIG. 25 is a partially exploded perspective view of a battery holder according to another embodiment of the present invention wherein a light source is provided within the body portion.

FIG. 25 illustrates another embodiment of the battery holder 10 according to the present invention which includes a light source 128. This embodiment of the battery holder 10 is substantially the same as the battery holder 10 described above in detail except that a light source 128 is provided within the rearward portion of the interior space 62 of the body 54 and the rear end cap 56 of the body 54 is transparent or translucent to permit transmission therethrough of at least a portion of the light produced by the light source 128. The light source 128 is operably connected to wire assembly 58 such that the light source 128 is powered by the batteries within the inner capsule 60 and preferably is provided with a switch for turning the light source 128 on and off.

It is noted that each of the features or attributes of the above described embodiments and variations can be used in combination with any of the other features and attributes of the other above described embodiments and variations as desired.

From the foregoing disclosure it will be apparent that the disclosed bicycle accessories 10 can be easily installed to a wide range of diameters and shapes of bicycle components in a convenient orientation. Additionally, the bicycle accessories 10 are secured with commodity cable ties 26 which are widely available in many lengths so that the user can fit a wide range of tubing sizes and trim any excess, and easily replace with a new cable tie if remounting is needed. Furthermore, the disclosed battery holders 10 are relatively inexpensive to produce yet can balance wheel lighting units 38, provide water-tight enclosures, protect against power cable strain, permit quick change of battery capsules 60 or change of batteries at remote locations, and directly power one or two electrical devices of a variety of types.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. An accessory for attachment to a wheeled vehicle having frame tubing, the accessory comprising, in combination:
   a body portion;
   a mounting portion secured to the body portion and having a V-shaped groove for receiving the tubing;
   wherein the mounting portion includes a mounting member removably secured to the body portion and a cap member secured to the mounting member and forming the V-shaped groove; and wherein the cap member comprises a resiliently flexible material.

2. The accessory according to claim 1, wherein the accessory is a battery holder.

3. The accessory according to claim 2, wherein the battery holder is configured to hold one of a plurality of AAA size batteries and a plurality of AA size batteries.

4. The accessory according to claim 1, wherein the mounting portion is removably secured to the body portion and can be removably mounted to the body portion with the groove in a plurality of orientations relative to the body portion.

5. The accessory according to claim 1, wherein the attachment member comprises a rigid material.

6. The accessory according to claim 1, wherein the groove has first and second portions separated by a notch, and the cover member forms the notch.

7. An accessory for attachment to a wheeled vehicle having frame tubing, the accessory comprising, in combination:
a body portion comprising a circular tube forming a sealed hollow interior space;
first and second mounting portions interchangeably securable to the body portion for mounting the body portion to the frame tubing in different orientations relative to the tubing;
wherein the interchangeable mounting portions each have a V-shaped groove for receiving the tubing and the grooves oriented in different directions relative to the body portion; and
wherein the first mounting portion is configured so that a longitudinal axis of the V-shaped groove of the first mounting portion extends perpendicular to a longitudinal axis of the circular tube of the body portion when the first mounting portion is secured to the body portion, and the second mounting portion is configured so that a longitudinal axis of the V-shaped groove of the second mounting portion extends parallel to the longitudinal axis of the circular tube of the body portion when the second mounting portion is secured to the body portion.

8. The accessory according to claim 7, wherein the accessory is a battery holder and the body portion further comprises a removable inner capsule within the sealed hollow interior space and configured for holding a plurality of batteries.

9. The accessory according to claim 8, wherein the battery holder is configured to hold one of a plurality of AAA size batteries and a plurality of AA size batteries.

10. The accessory according to claim 7, wherein the interchangeable mounting portions are each removably secured to the body portion with screws.

11. The accessory according to claim 7, wherein the body portion further comprises at least one end cap removably secured to the circular tube and configured to selectively provide access to the hollow interior space.

12. The accessory according to claim 7, wherein the grooves each have first and second portions separated by a notch.

13. A wheeled vehicle comprising, in combination:
a wheel having a hub;
a battery holder comprising a body portion configured for holding a plurality of batteries and a mounting portion secured to the body portion and having a V-shaped groove engaging; and
at least one cable tie encircling the hub and at least a portion of the mounting portion of the accessory to secure the mounting portion to the hub;
wherein the battery holder is configured so that at least a portion of the body portion holding the batteries can be removed from the mounting portion to change the plurality of batteries while the at least one cable tie secures the mounting portion to the hub; and
wherein a longitudinal axis of the body portion extends perpendicular to a rotational axis of the hub.

14. The wheeled vehicle according to claim 13, wherein the battery holder is configured to hold one of a plurality of AAA size batteries and a plurality of AA size batteries.

15. The wheeled vehicle according to claim 13, further comprising a light secured to the wheel and wherein the battery holder is secured to the hub on an opposite side of the hub from the light to at least partially offset weight of the light.

16. The wheeled vehicle according to claim 13, wherein the groove has first and second portions separated by a notch.

17. The wheeled vehicle according to claim 16, wherein the tubing is curved and engages each of the first and second portions of the groove.

18. The wheeled vehicle according to claim 13, wherein the body portion comprises a body forming a sealed hollow interior space and a removable inner capsule removably located within the sealed hollow interior space and configured for holding the plurality of batteries.

19. A wheel comprising, in combination:
a hub;
a rim;
at least one spoke connecting the hub and the rim;
a light unit secured to the at least one spoke;
a battery holder secured to the hub and electrically connected to the light unit; and
wherein the battery holder is secured to the hub on an opposite side of the hub from the light unit to at least partially offset weight of the light unit; and
wherein a longitudinal axis of the battery holder extends perpendicular to a rotational axis of the hub.

20. The wheel according to claim 19, wherein the battery holder is configured to hold one of a plurality of AAA size batteries and a plurality of AA size batteries.

21. The wheel according to claim 19, wherein the light and the battery holder are positioned so that the battery holder fully offsets the weight of the light unit to balance the wheel.

22. The wheel according to claim 19, wherein the battery holder has a mounting portion with a V-shaped groove engaging the hub.

23. The wheel according to claim 22, further comprising at least one cable tie encircling the hub and at least a portion of the mounting portion of the battery holder to secure the battery holder to the hub.

24. A battery holder for attachment to a wheeled vehicle, the battery holder comprising, in combination:
a body portion forming a water-tight interior space for holding at least one battery;
a mounting portion secured to the body portion for mounting the body portion to the wheeled vehicle;
a pair of power cables having first ends operably connected to the at least one battery within the interior space and extending through openings in the body portion so that second ends opposite the first ends are located outside the body portion;
a pair of seal members within the interior space at the openings and between which the power cables extend; and
wherein the seal members comprise a resiliently flexible material and are compressed about the power cables and against the body portion to seal the openings.

25. The battery holder according to claim 24, wherein the body portion is configured to hold one of a plurality of AAA size batteries and a plurality of AA size batteries.

26. The battery holder according to claim 24, further comprising a cover located over the openings.

27. The battery holder according to claim 26, wherein the mounting portion is removably secured to the body portion and the cover is secured to the mounting portion.

28. The battery holder according to claim 27, wherein the power cables extend between the body portion and the mounting portion and are compressed therebetween to form strain reliefs for the power cables.

29. A battery holder for attachment to a wheeled vehicle, the battery holder comprising, in combination:
- a body portion forming a water-tight interior space for holding at least one battery;
- a mounting portion removably secured to the body portion for mounting the body portion to the wheeled vehicle;
- a pair of power cables having first ends operably connected to the at least one battery within the interior space and extending through openings in the body portion so that second ends opposite the first ends are located outside the body portion; and
- wherein the power cables extend between the body portion and the mounting portion.

30. The battery holder according to claim 29, wherein the body portion is configured to hold one of a plurality of AAA size batteries and a plurality of AA size batteries.

31. The battery holder according to claim 29, wherein the power cables are compressed between the body portion and the mounting portion to form strain reliefs for the power cables.

32. The battery holder according to claim 31, wherein mounting portion is removably secured to the body portion with screws.

33. A battery holder for attachment to a wheeled vehicle, the battery holder comprising, in combination:
- a body portion forming a water-tight interior space;
- a mounting portion removably secured to the body portion for mounting the body portion to the wheeled vehicle;
- an inner capsule located within the interior space for holding at least one battery and removable from the body portion;
- wherein the at least one battery is a rechargeable lithium battery; and
- a printed circuit board within the inner capsule and having an integrated charging circuit and charging plug for the rechargeable lithium battery.

34. The battery holder according to claim 33, wherein the charging plug for the rechargeable lithium battery is a USB port accessible through an opening in the inner capsule.

\* \* \* \* \*